April 21, 1959  D. W. BRADY  2,882,667
CROP CUTTING, BLOWING AND GATHERING IMPLEMENT
Filed June 2, 1955

Witness
Edward P. Seeley

Inventor
Dale W. Brady
by Talbert Dief & Adler
Attorneys

United States Patent Office 2,882,667
Patented Apr. 21, 1959

2,882,667

CROP CUTTING, BLOWING AND
GATHERING IMPLEMENT

Dale W. Brady, Altoona, Iowa

Application June 2, 1955, Serial No. 512,841

3 Claims. (Cl. 56—24)

This invention relates to farm equipment and more particularly to implements for cutting, harvesting and/or macerating such crops as cane, cornstalks, cotton stalks, hay, beans, vines and like.

In recent years there have been various cornstalk macerators placed on the market. Originally, their purpose was to kill corn borers and to reduce the cornstalk to a size to permit successful subsequent earth cultivation. One of the most successful species of cornstalk cutters were ones that used lengths of chains on a rotating cylinder as the pulverizing and breaking medium. However, due to excessive dirt and dust engendered by the flailing lengths of chain, I experimented with an inverted hopper or chute over the cutting and breaking chains for collecting and exiting the severed material to the rear and if desired into a collecting wagon. Such machine was disclosed in my co-pending application on a Crop Macerating Implement filed in the United States Patent Office on February 26, 1954, Serial No. 412,689. However, with the depositing of the material, such as broken cornstalk, into a collecting vehicle, it became obvious that such material might well be of value. From experiments I found that such macerating implements were particularly adapted to the harvesting of such as hay and like green crops, i.e., the device would successfully cut the crop, and deposit it into the collecting wagon in one operation in the form of silage. This was indeed a successful step in harvesting but I soon found that the device would not operate uniformly under all conditions. While the specific crop was a factor per se, I found that the state of its maturity was also an important factor. Furthermore, the amount of moisture content changed the results.

After field tests I discovered that the problem was one of adjustable air supply, laterally and to the sides of the cutting chains that not only severed the crop, but also produced the "centrifugal fan" effect for moving the cut crop upwardly and to the rear.

Therefore, one of the principal objects of my invention is to provide a crop harvester that permits air control adjustment laterally to the hooded rotating cutting members.

Still further objects of this invention are to provide a crop harvester that is durable in use and economical in manufacture.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Figure 1:
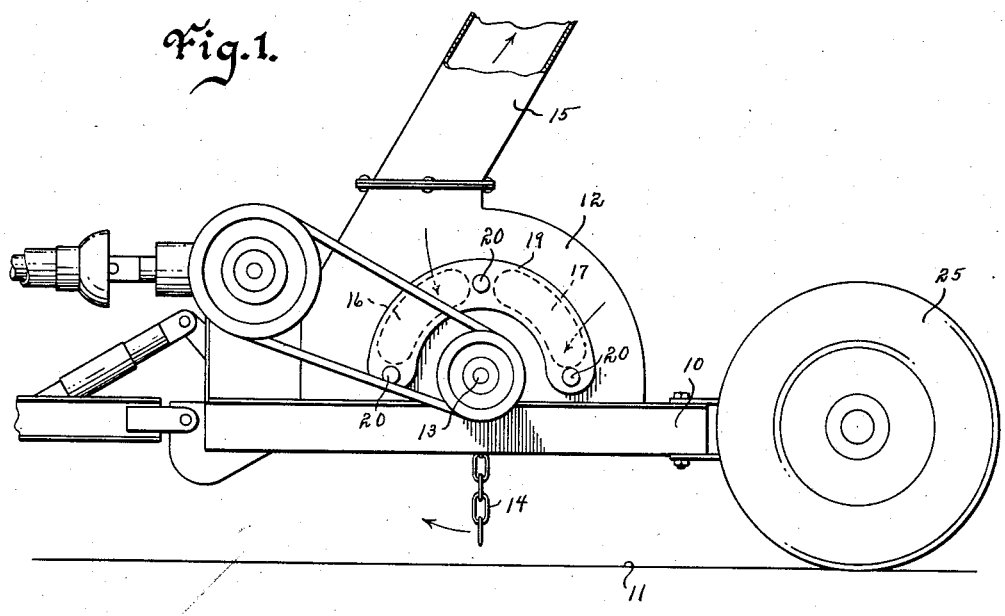
Fig. 1 is a side view of my device ready for use.

In the drawings I have used the numeral 10 to generally designate the chassis of a crop macerator, supported above the ground surface 11 by wheel means 25 and by having its forward portion secured to the pulling vehicle such as a tractor (not shown). Such harvester chassis of this type have an inverted hood element 12. Extending under the inverted hood in spaced relationship is a rotatably mounted shaft 13 arranged transversely of the direction of travel of the implement. Secured at one end and spaced apart from each other on the shaft are a plurality of chain lengths 14. While such shafts 13 may be rotated by an engine on the chassis, most are operatively connected to the power take off of the tractor (not shown). This is, however, not a part of my invention, it being understood that the shaft 13 may be rotated by any suitable means. The numeral 15 designates an inverted hopper or chute element on and communicating with the inside top of the inverted hood for receiving the severed crop and passing the same rearwardly. The purpose of the chains 14 are to sever the crop, break the same into pieces and cause a centrifugal air blast intended to carry the crop in suspension upwardly to the top of the hood 12, thence through and out of the element 15. It is to such equipment that I install my adjustable ventilating means and which I will now describe in detail.

The ends of the inverted hood 12 are flat and extend vertically. I install my device on each of the two ends, and inasmuch as they are duplicates I will confine my explanation to only one side, it being understood that I install a device at both ends of the inverted hood 15.

Figure 2:
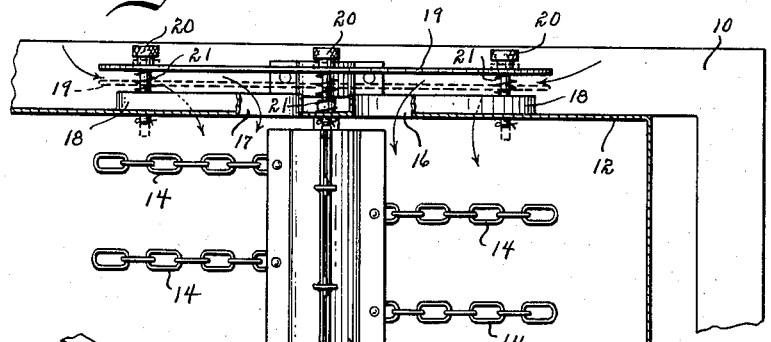
Fig. 2 is an enlarged top sectional view of one end portion of my implement and more fully illustrates my adjustable air vent means.
Figure 3:
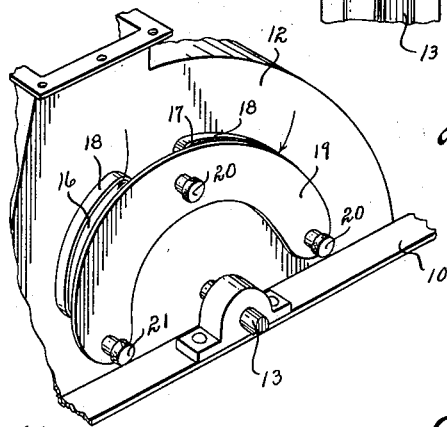
Fig. 3 is an enlarged perspective view of one end portion of the implement showing the adjustable means for controlling a supply of air to the chain beaters.

I cut two curved elongated spaced apart holes 16 and 17 in each end of the inverted hood 15. These hole openings are concentric with and spaced apart from the shaft 13 and are located above the shaft 13 as shown in Fig. 1. Embracing each hole opening is an outwardly extending continuous lip flange 18. The numeral 19 designates a curved elongated baffle plate adapted to extend over and be adjustably spaced apart from each side pair of lip flanges 18 as shown in Fig. 3. Therefore, one plate, which is in effect an adjustable damper means, serves two openings 16 and 17. Loosely extending through each baffle plate 19 are three cap screws 20 having their forward end portions threaded into the inverted hood 12 as shown in Fig. 2. The numeral 21 designates a coil spring embracing each of the cap screws 20, having one end engaging the inside of the plate 19, and its other end engaging the outer side of the end of the inverted hood 12 as shown in Fig. 2.

The practical operation of my invention is as follows: The implement is moved through the crop to be harvested and the efficiency of the chains producing the centrifugal air fan effect are noted relative to the material being exited through the element 15. The longer period of time the material is retained inside the hood 12, the finer it will be broken up. The fine or coarse pieces may or may not be the wish of the user of the implement. Obviously, the space between the plate 19 and the flange lips 18 will determine the amount of air entering through the holes 16 and 17. With a minimum amount of air the material would be retained longer within the hood 12 and by increasing the volume of air, the material would be retained a shorter period of time. Also the type of material and its condition will require air vent adjustment. This adjustment is accomplished merely by screwing the cap screws 20 in or out, thus bringing the plate 19 closer to or further from the flanges 18. The springs 21 are sufficiently strong to yieldingly hold the plate 19 away from the lip flanges. After the proper adjustment has been made of the air control means at each side of the inverted hood to produce the desired fineness of the material and to successfully get it up and out of the element 15, the controls are left so adjusted and the crop is then harvested. I have also found that by use of my air vent means at each side of the hood 12, there is less annoying dust around the implement and therefore the product being exited through the element 15 is of a cleaner nature. Furthermore, with my device the machine will pick up the crop better and there is less loss of cut material left on the ground. With the lip flanges 18 extending horizontally outwardly from the inverted hood, the air will be sucked in horizontally laterally from each side of the implement instead of from a direction toward the ground under the implement which if permitted would affect the efficiency of the chain air impellers. Also less dust enters the inverted hood through the openings 16 and 17.

Some changes may be made in the construction and arrangement of my crop cutting, blowing and gathering implement without departing from the real spirit and purpose of my invention, and it is my intention to cover by my claims, any modified forms of structure or use of mechanical equivalents which may be reasonably included within their scope.

I claim:

1. In a crop cutting and gathering machine having an inverted semi-cylindrical hood with top and side portions, a frame on which said hood is mounted for movement transversely of the direction of travel, and a rotatable chopping and gathering structure journaled in said hood and being substantially co-axial therewith and including lower effective portions movable out beneath said hood for chopping crops to be received in the hood, said structure including a plurality of cutting and chopping members longitudinally spaced and radially disposed when said structure is rotated, a discharge spout communicating with and extending above said hood for receiving crops discharged therefrom, said cutting and chopping portions being effective when rotated to produce a centrifugal fan effect affording peripheral discharge of the harvested crops upward toward the inner surface of the top portion of said hood and out of the discharge spout due to axial pressure within said hood above the axis of rotation of the rotatable structure, said hood including at least one opening in one side portion thereof positioned above, radially spaced from and between the axis of rotation of said rotatable structure and the outer periphery of said cutting and discharge portions whereby air moves axially into said hood above said axis of rotation and within the circumferential path of rotation of said portions to facilitate the upward movement of the crops within the downwardly opening hood and peripherally therefrom through said spout.

2. The structure of claim 1 including means operatively associated with said opening for controlling the volume of air drawn through said opening.

3. The structure of claim 2 wherein said means includes a baffle plate spaced apart from said opening, and means associated with said plate and said hood for securing said plate in various positions of its movement to control the amount of air taken into said hood through said opening.

References Cited in the file of this patent
UNITED STATES PATENTS

| | | |
|---|---|---|
| 994,808 | Watts | June 13, 1911 |
| 1,713,094 | Saiberlich et al. | May 14, 1929 |
| 2,552,037 | Elverum | May 8, 1951 |
| 2,634,570 | Brockman et al. | Apr. 14, 1953 |
| 2,659,188 | Haban | Nov. 17, 1953 |
| 2,661,584 | Ronning | Dec. 8, 1953 |
| 2,701,941 | Heth | Feb. 15, 1955 |